No. 621,818. Patented Mar. 28, 1899.
R. HORNSTEINER.
APPARATUS FOR MANUFACTURING HORSESHOE STUDS OR CALKS.
(Application filed Apr. 5, 1898.)
(No Model.) 4 Sheets—Sheet 1.
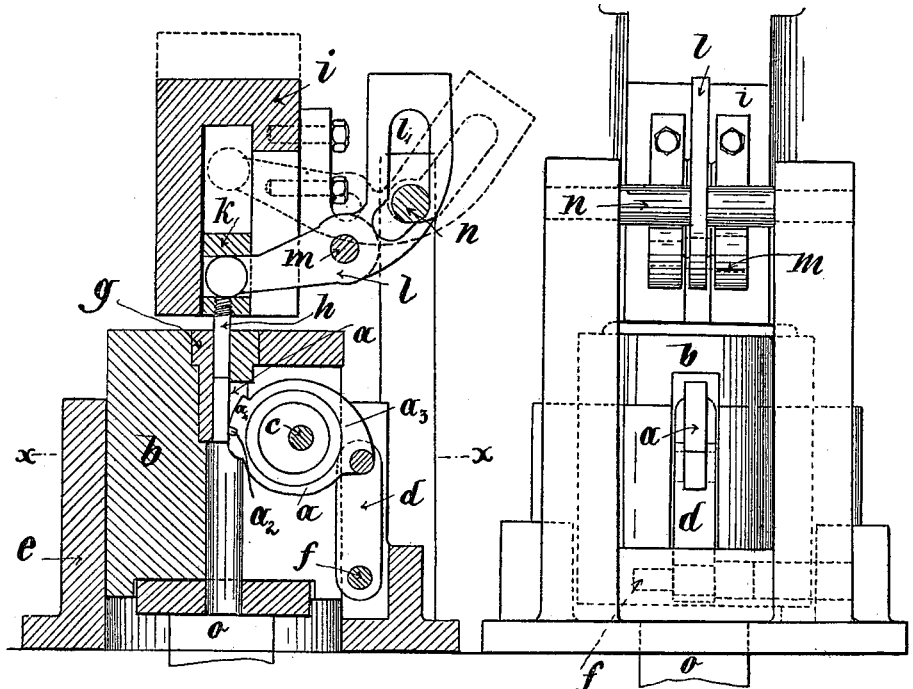
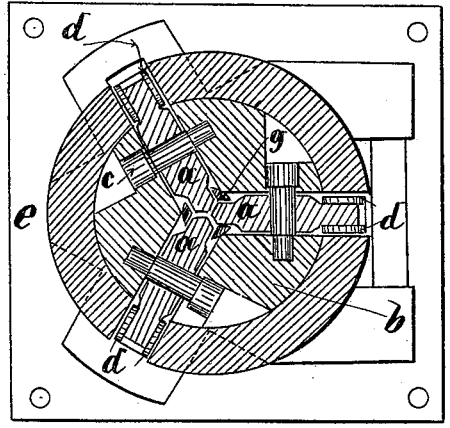
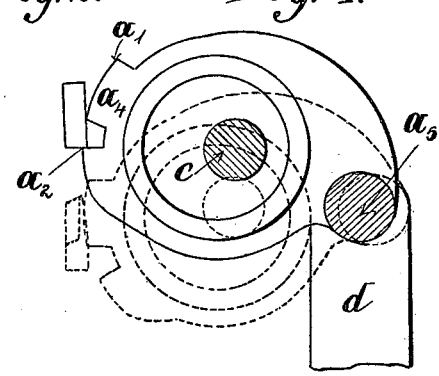
Witnesses:
Inventor
Rudolf Hornsteiner
by
Attorneys.

No. 621,818. Patented Mar. 28, 1899.
R. HORNSTEINER.
APPARATUS FOR MANUFACTURING HORSESHOE STUDS OR CALKS.
(Application filed Apr. 5, 1898.)
(No Model.) 4 Sheets—Sheet 2.
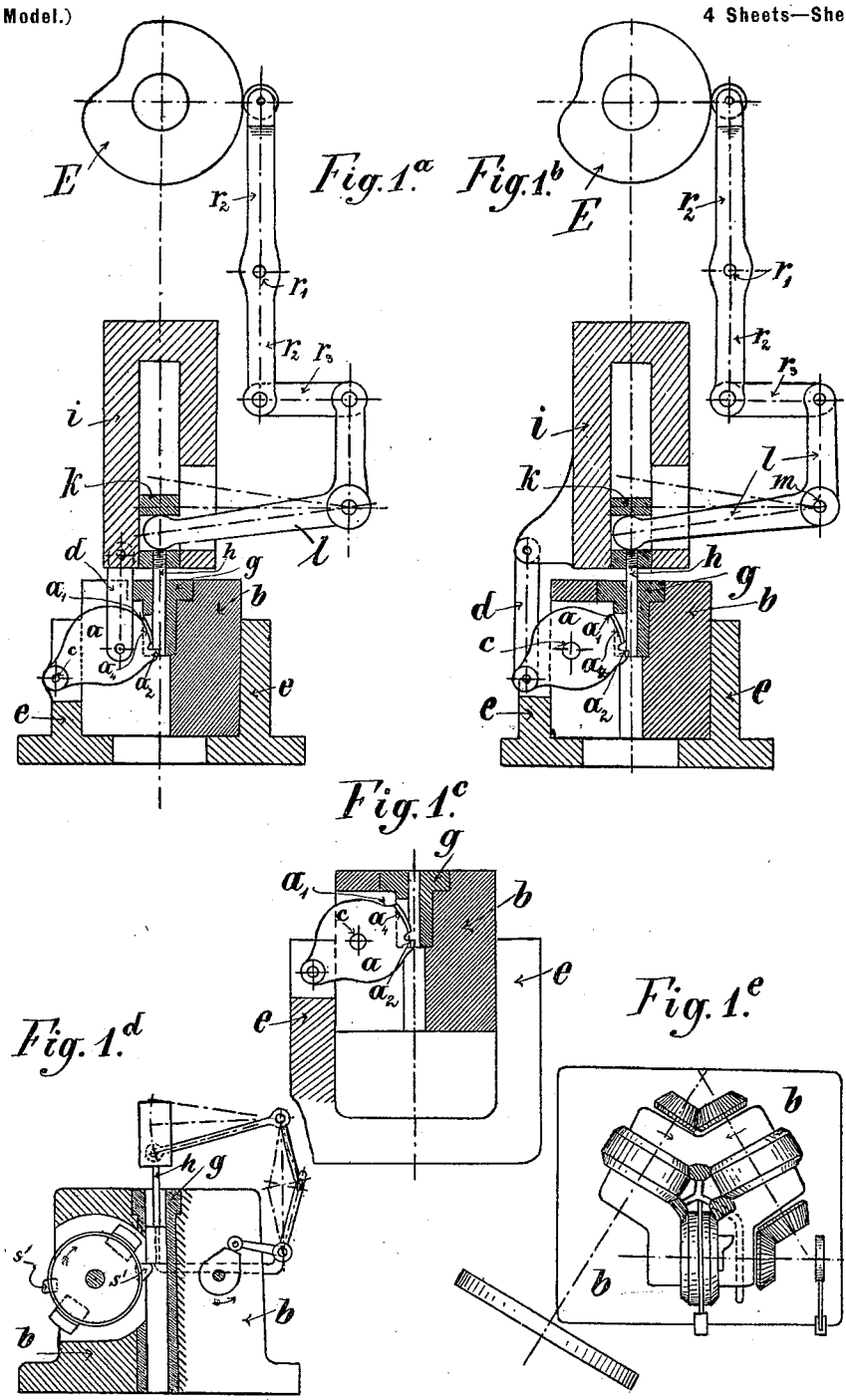

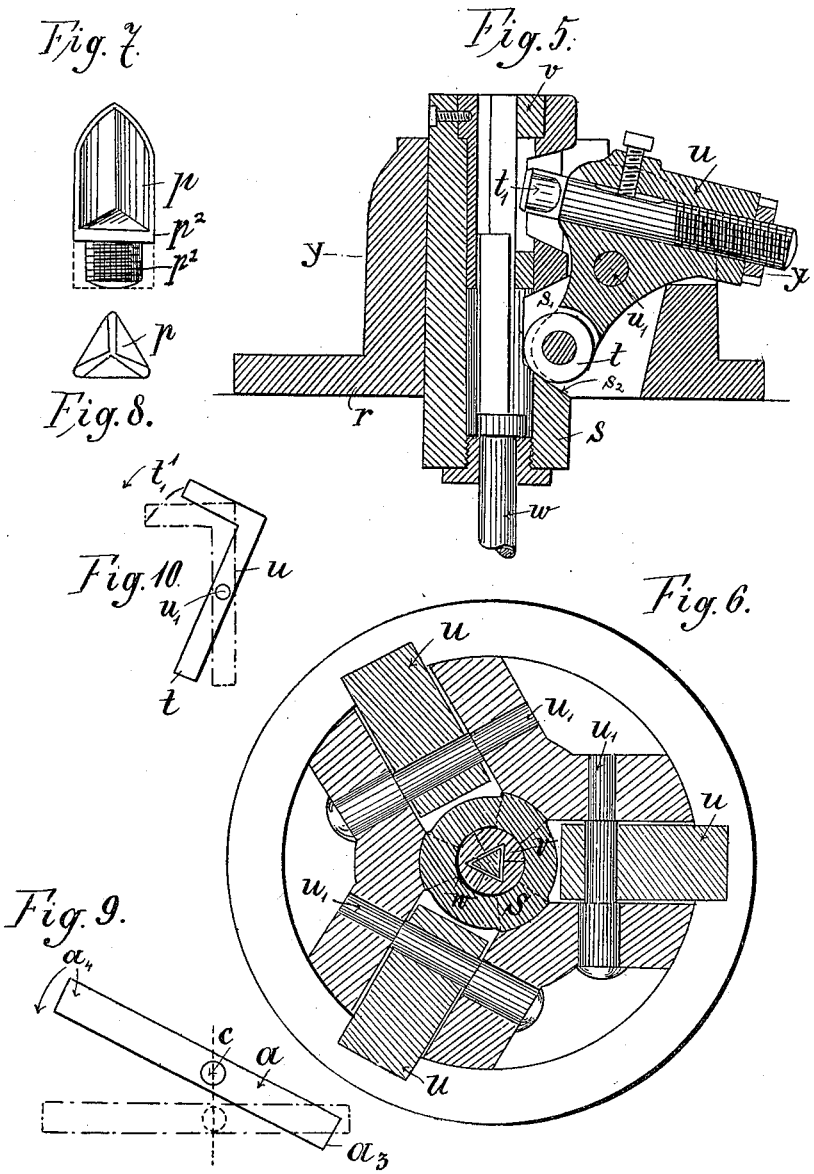

No. 621,818. Patented Mar. 28, 1899.
R. HORNSTEINER.
APPARATUS FOR MANUFACTURING HORSESHOE STUDS OR CALKS.
(Application filed Apr. 5, 1898.)
(No Model.) 4 Sheets—Sheet 4.
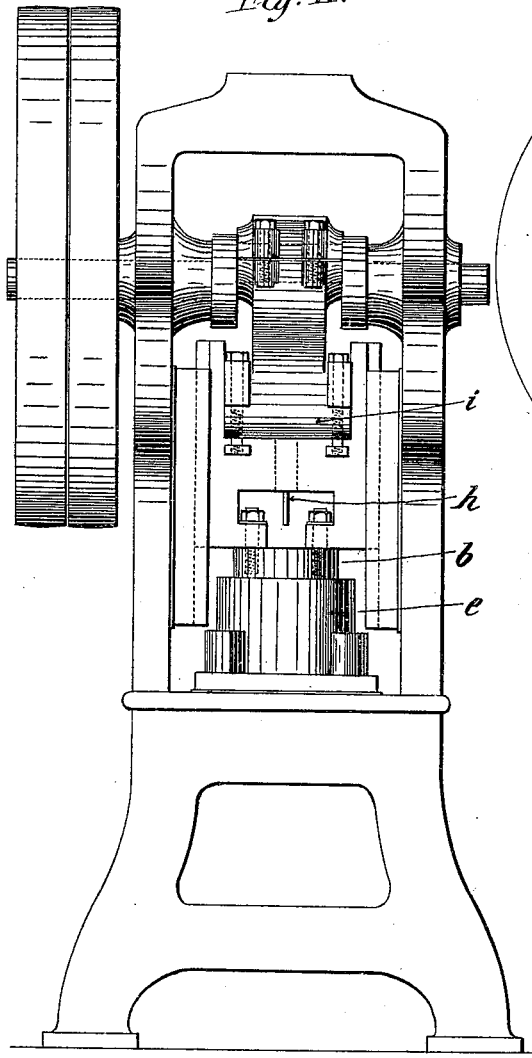
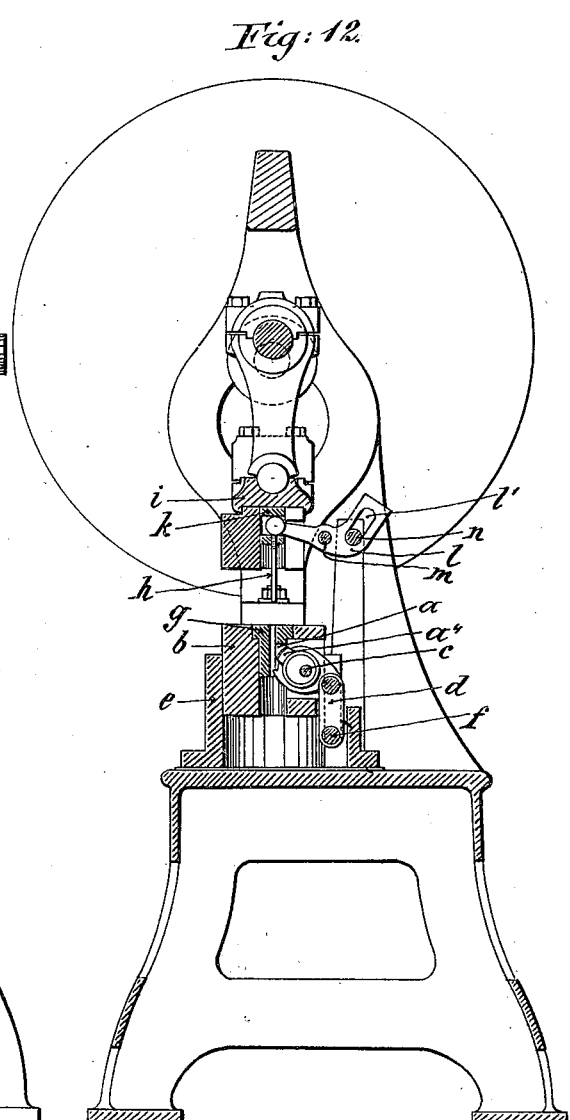
Witnesses:
Inventor:
Rudolf Hornsteiner
by
Attorneys.

UNITED STATES PATENT OFFICE.

RUDOLF HORNSTEINER, OF PRAGUE-ZIZKOV, AUSTRIA-HUNGARY.

APPARATUS FOR MANUFACTURING HORSESHOE STUDS OR CALKS.

SPECIFICATION forming part of Letters Patent No. 621,818, dated March 28, 1899.

Application filed April 5, 1898. Serial No. 676,522. (No model.)

*To all whom it may concern:*

Be it known that I, RUDOLF HORNSTEINER, a citizen of Austria-Hungary, residing at Prague-Zizkov, in the Province of Bohemia, in the Empire of Austria-Hungary, have invented certain new and useful Improvements in Apparatus for Manufacturing Horseshoe-Roughing Studs or Calks, of which the following is a specification.

This invention relates to an apparatus for the manufacture of roughing studs or calks with rib-like (in the present example three-ribbed) section, but with a full base at that part which bears against the horseshoe. These calks have the advantage that contrary to the simply pointed solid roughing-calks (in which used upon the hard ground the heading-surface always increases, affording less resistance against slipping) they remain always of the same small section, having always the same heading-base.

I will describe the said apparatus with reference to the accompanying drawings, in which—

Figure 1 shows a vertical section of one arrangement of the machine which I employ for such manufacture. Fig. 2 is a section on line $x\,x$, Fig. 1. Fig. 3 is a rear view of the machine. Fig. 4 is an enlarged view of the pressing disk or lever and die. Figs. 5 and 6 show, respectively, a vertical section and a cross-section on line $y\,y$, Fig. 5, of a modified construction of the pressing levers and dies. Figs. 7 and 8 are a side and end view, respectively, of a calk made by this apparatus. Figs. 9 and 10 show diagrams of the lever action of both constructions. Figs. 11 and 12 are respectively a side elevation and a vertical section of an organized apparatus for making calks in accordance with my invention. Figs. $1^a$, $1^b$, and $1^c$ are vertical sections of different modifications of the actuating mechanism. Figs. $1^d$ and $1^e$ show a vertical section and sectional plan of an arrangement of the pressing-dies and supporting device having continuous rotary motion for taking up and holding the blanks before they are formed into roughing-studs.

The apparatus consists, essentially, of a number of correspondingly-profiled pressing cheeks or dies mounted on disks or levers which in reciprocating or revolving force the dies against the blank while at a white heat and in operating with a longitudinally-advancing pressure force the displaced metal longitudinally forward, as indicated at Fig. 4, thereby producing a tapering or pointed end to the stud, as shown at Fig. 7, while leaving a base $p^2$ of the full size and a portion $p'$ for receiving a screw-thread. As shown on the drawings, the press employed for this purpose, and which may be actuated by cranks, cams, screws, or hydraulic pressure, consists mainly of a number of (here shown as three) levers or disks $a$, Figs. 1 and 2, rotatably mounted upon axes $c$ in a fixed or movable support $b$ and arranged radially to the blank, so that on rotating the disks or levers $a$ the pressing-dies are made to press inward against the blank, so as to cause it to assume the ribbed or star-shaped form shown at Figs. 7 and 8. In order to bring the blank into the correct longitudinal position for the dies to act thereon in such manner as to leave the requisite base $p^2$ and screwed portion $p'$, the levers or disks $a$ are provided with projections $a^2$, on which the blank rests before it is acted upon by the dies. In place of these projections $a^2$ may be used a support, Fig. $1^d$; but the first arrangement is more convenient. For bringing the blank into the correct position relatively to the dies a rod $h$ is employed, which is caused by means to be presently described to press the blank downward. The finished stud or calk falls down through the socket $g$, in which the pressing has been effected, as soon as it is released by the dies as these continue rotary motion.

The pressing-dies and other working parts can be actuated in various ways.

In the arrangement shown at Figs. 1 to 4 the disks or levers $a$, carrying the pressing-dies, are carried on axes $c$, supported in movable blocks or cylinders $b$. The point of the disk or end of the lever diametrically opposite the die is connected to one end of a link $d$, pivoted at its other end to a pin $f$, carried by a fixed frame $e$, that surrounds the support $b$. From this it will be seen that if the block $b$, and consequently the axes $c$, be moved longitudinally while the pin $f$ remains stationary the disk or lever $a$ will be partially rotated through a distance proportionate to the stroke of the block $b$. The disk or lever is thereby made to protrude the pressing-die through a slot in the guide-socket $g$ in the block $b$, the interior of which adapted to receive the stud-blank and into the upper end of which projects the rod $h$, sliding in the plunger $i$, which is actuated by the press in any suitable manner. The rod $h$ is made to slide in the plunger $i$ in order that it may be moved downward in advance of the latter, so as to push the white-hot blank rapidly in the socket $g$ until it rests upon the projection $a^2$ before the plunger $i$ presses the block $b$ downward, so as to actuate the disks or levers $a$. The said advance motion of the rod $h$ can be effected in various ways. One arrangement is shown at Figs. 1 and 3. The rod $h$ is in this case screwed into a block $k$, in a slot of which is engaged the one end of the two-ended lever $l$, that is actuated by the plunger $i$. The lever is pivoted to a pin $m$, carried by the plunger, and its other arm has a slot $l'$, with which is engaged a bolt $n$, carried by fixed uprights $x$. The slot $l'$ is made with an elbow, as shown at Fig. 1, so that the lever $l$ will follow the first part of the upward motion of the plunger without being turned upon its pivot $m$; but when the lever has risen with the plunger to the point where the bolt $n$ bears against the elbow of the slot $l'$ the lever will be rapidly turned on its pivot, (as the leverage $m\,n$ is about half that of $m\,k$,) so as to raise the rod $h$ relatively to the plunger, as shown by the dotted lines at Fig. 1. On the downward motion of the plunger the converse action will take place—that is to say, the rod $h$ will first be rapidly protruded from $i$, thereby pushing the heated blank down into the socket, as described, and will then move down at the same speed as the plunger $i$.

The action of the machine will be as follows: Starting from the position shown at Fig. 1, which is that after the completion of the formation of roughing stud or calk, the plunger $i$ has moved upward to a certain extent and the block $b$ has at the same time been raised by the plunger $o$ below, actuated by the press, and by this motion the disks or levers $a$ have been turned back into their original position. As the plunger rises still higher—say into the position shown in dotted lines at Fig. 1—the elbow of the slot $l'$ will press up against the bolt $n$ and the lever will be turned so as to rapidly raise the rod $h$. A white-hot blank is now inserted into the opening of the socket $g$, whereupon the plunger $i$ descends and the rod $h$ rapidly pushes the blank down $g$ onto the projection $a^2$. On the further descent of the plunger $i$ the block $b$ will be pressed downward, thereby thus actuating the disks or levers $a$, as indicated by the diagram Fig. 9, so as to operate on the blank in the above-described manner, after which the finished stud $p$ is released and falls down. After cooling this has a screw-thread cut on its base, as shown at $p'$, Fig. 7, while the part $p^2$ remains of the original size.

It is immaterial for the proper action of the disks or levers $a$ whether the block $b$ be made to rise and fall, as described, the surrounding casing $e$ being fixed, or whether $b$ be fixed and $e$ be made to rise and fall, or whether both are made movable. In both the last-named cases the pivot $m$ of the lever $l$ would be fixed and the bolt $n$ would be made movable, the action on the rod $h$ being the same as in the first case. This arrangement is more or less necessary when the apparatus is fitted in a press that only has a motion in the longitudinal axes, such as screw and hydraulic presses, for actuating the lever $l$ by such longitudinal motion. With crank or eccentric presses the two parts $b$ and $e$ are fixed together, and the movement of the lever $l$ is effected from the crank motion by means of the cam E, Figs. $1^a$ and $1^b$, the motion being transmitted, for example, through a two-ended lever $r^2$, pivoted at $r'$, which is connected by means of a link $r^3$ to the one arm of the elbow-lever $l$.

If a crank-press be employed, with $b$ and $e$ fixed together, as described, the arrangement may be such that the plunger $i$ acts directly upon the disk or lever $a$ by means of the link $d$, as at Figs. $1^a$ and $1^b$, the connection of the link with the disk or lever $a$ in Fig. $1^a$ being arranged between the pressing-die and the fulcrum $c$, while in Fig. $1^b$ it is placed on the opposite side of the fulcrum $c$, thus constituting a double-ended lever $a$.

In the arrangement at Fig. $1^c$ the block $b$ is assumed to be fixed and the casing $e$ vertically movable, and thereby actuating dies, as shown.

In the arrangement shown in vertical section and plan at Figs. $1^d$ and $1^e$ the disks carrying the dies are made to revolve continuously in one and the same direction, the simultaneous rotation of the three disks being effected by bevel-gear transmission.

In the construction shown at Figs. 5 and 6 a hollow cylinder $s$ is moved by a press up and down in a fixed casing $r$ and is formed with three vertical slots $s'$, each divided into two by a transverse piece. On the inclined face $s^2$ of the lower slot rests a roller $t$ on the one end of the pressing-lever $u$, pivoted on a bolt at $u'$ and carrying the adjustable pressing-die $t'$, which projects through the upper slot. The upper end of the hollow cylinder $s$ is fitted with a correspondingly-slotted socket $v$, into which are inserted the blanks for the roughing-studs. The cylinder $s$ being moved longitudinally, the inclined faces $s^2$ act upon the rollers $t$, and thereby move the levers $u$ so as to press the dies $t'$ against the heated blank, as indicated by the diagram Fig. 10. On the motion of the cylinder $s$ being reversed the levers will turn back by gravity, so as to remove the dies from the finished roughing-stud, whereupon the stud is removed from the socket $v$ by the upward motion of a rod $w$, actuated by any suitable moving part of the press.

Having now particularly described and ascertained the nature of my said invention and in what manner the same is to be performed, I declare that what I claim is—

1. In apparatus for manufacturing horseshoe studs or calks, the combination of a suitable support provided with an orifice, the sides of said support being provided with slots or recesses opening into the central opening, movable elements arranged in said recessed slots and provided with dies or pressing-cheeks having corresponding profiles, and projections on said elements adjacent to the dies or pressing-cheeks, upon which projections the blanks are adapted to rest, and a plunger working in the central opening of the said supports, substantially as set forth.

2. In apparatus for manufacturing horseshoe studs or calks, the combination of suitable support provided with a guide-socket and having slots at the sides of the socket, levers pivoted in said slots and provided with projecting dies or pressing-cheeks having corresponding profiles, means for oscillating said levers, and a plunger working in said socket, substantially as set forth.

In testimony that I claim the foregoing as my invention I have signed my name in presence of two subscribing witnesses.

RUDOLF HORNSTEINER.

Witnesses:
D. VORTHERFREUM,
ADOLPH FISCHER.